3,464,919
**METHOD OF CONCENTRATION OF
ORGANIC SLUDGES**
Jiri Barta, Prague, Jan Fechtner, Susice, Jiri Hanzlicek and Miroslav Verner, Prague, and Dobromil Vesely, Usti nad Labem, Czechoslovakia, assignors to Ceskoslovenska Academie ved, Prague, Czechoslovakia
No Drawing. Filed Apr. 13, 1967, Ser. No. 630,541
Int. Cl. C02c 1/14, 1/02
U.S. Cl. 210—11          6 Claims

ABSTRACT OF THE DISCLOSURE

A method of concentration of organic sludges without material waste of organic matter and nitrogen comprising fermenting the aqueous organic nitrogenous matter containing sludge with non-pathogenic microorganisms capable of causing at least a partial cleavage of the cell walls, adding a nitrogenous ions-furnishing compound to the sludge, addition of said compound enabling said added non-pathogenic microorganisms in the sludge to cause said partial cleavage of the cell wall, permitting the fermentation of the sludge to proceed for a time and at a temperature sufficient to effect said cleavage and fermentation of polysaccharidic non-nitrogenous substances in the cell walls and to cause the evolution of gases predominantly consisting of carbon dioxide and methane and being substantially free of nitrogen and thus to cause the flotation of part of the sludge, discontinuing the fermentation as soon as said cleavage and flotation has occurred and before any evolution of nitrogen gas occurs, and separating the biological dry matter in the flotated part of the sludge from the aqueous phase of the flotated part of the sludge.

Background of the invention

In sewage treatment plants operating by biological processes, for example activation or biological filtration, a considerable amount of sludge is produced which consists of a biocoenose of various microorganisms, such as bacteria, moulds, algae, Cyanophyta, protozoans. A crucial and not easily solved problem in these processes is the separation of the biological mass from the aqueous portion; various procedures have been proposed and tried for that purpose. The most common method is the anaerobic septicization of biological sludges. This process, however, requires a large investment and high operational costs and is therefore economically undesirable. In addition, the decay causes the formation of a gaseous phase, composed above all of methane, carbon dioxide, hydrogen and nitrogen, which phase as a rule escapes and represents a loss.

Another procedure is based on the centrifugation of native sludges on separators of a conventional type. The disadvantage of this process is a low content of dry matter in the final product which does not exceed 7%, due especially to the high content of intracellular water. When high output separators are used, it is possible to achieve up to 10% of dry matter. However, since some sludge forming microorganisms have cases containing dextranes, levulanes and similar substances, the biomass formed after separation of the aqueous portion is rather viscous. Intracellular water may be separated either by using thermolysis or chemically, but the aqueous portion then is strongly polluted and the treatment of the sludge accordingly involves high costs proportional to the results of the procedure.

Sludge has been separated from water also by filtration which could be accomplished only after previous precipitation of the sludge with lime or by filtration of the sludge through a layer of kieselguhr, power plant light ashes or similar material. A recent procedure involved the separation of sludge by means of an air stream by which 5 to 6% of dry matter was obtained which, after additional separation, went up to 10% of dry matter. The investment and operational costs were relatively high and the process therefore not economical.

Summary of the invention

It is an object of the present invention therefore to accomplish separation of an organic sludge from the aqueous phase without substantial loss of organic matter and nitrogen.

Another object of the invention is to operate such process without the necessity of a high investment for plant machinery and equipment and at a low operational cost.

These and other objects are accomplished by a process which in summary comprises fermenting the sludge by means of non-pathogenic microorganisms capable of causing at least a partial lysis of the cellular cases.

During the fermentation gases will evolve which support the flotation of the sludge. Advantageously nitrogen containing matter is added to the fermentation medium. An example of such medium is *Pseudomonas eisenbergii*.

Description of the preferred embodiments

The present invention, as stated is based on a method in which organic sludges are fermented using non-pathogenic-anaerobic, or optionally also aerobic, microorganisms which cause at least a partial lysis of the cell walls, for example by means of *Pseudomonas eisenbergiie*, upon addition of substances containing nitrogen in the form of $NO_2^-$ or $NO_3^-$ ions.

The invention thus uses specific microorganisms capable of causing the lysis of the cellular membranes of the microorganisms present in biological sludges and in the intracellular water. In this manner polysaccharidic non-nitrogenous substances such as dextranes and levulanes are partly fermented with evolution of gases, such as carbon dioxide and methane but without loss of nitrogen. The gases which latter escape and cause the flotation of the biosludge accumulating in the upper layers of the processing material. The biologically flotated sludge at the end of the process contains 5 to 7% of dry matter. This is achieved without any power input whatsoever.

The biological sludge concentrated, for example in floccules settling tanks, to a concentration of 1% of dry matter is separated into three layers. The upper portion, i.e. about 1/10 of the volume of the total material, is a biologically floated sludge. The intermediate portion representing approximately 8/10 by volume contains clarified waste water which has a lower percentage of impurities than the original filtrate of water separated from the native biological sludge. The lowermost portion, i.e. about 1/10 by volume, contains a not easily flotable sediment together with the bacterial cultures used. This lowermost portion is used for the inoculation of new batches of material. The central portion which is entirely clear shows a degree of pollution admissible for introduction in public streams and may therefore be discharged into a suitable vessel. The upper portion containing 5–6% of dry matter may either be directly processed to produce a fertilizer or furher concentrated for example on suitable types of centrifuges.

While centrifuged native sludge at the highest technologically practical speed, i.e. at about 5000 g.=8000 r.p.m., has 10% of dry matter and the sludge after thermolysis at a temperature of 80° C. has 12% of dry matter, the sludge after the biological floation of the present invention has a structure permitting, after centrifugation on conventional sewage plant devices, to obtain a dry matter contents of approximately 16%. This is due to the complete change of the physical structure of the biological sludge.

The bacterially flotated sludge obtained does not show a decreased biological value, which means that no losses in nitrogen occur. On the contrary the content of nitrogen in the process of fermentation slightly increases up to a value of 6.0–6.7% which represents 38–43% of the total proteins. The content of vitamins, for example of vitamin $B_{12}$, remains likewise unchanged which is important for a possible utilization of some kinds of activated sludges as admixtures into feed mixtures.

The advantages of the present invention are evident from the following examples:

Example I

A bacterial culture of the genus Clostridium sp. strain V/32 was maintained in the usual way on meat peptone agar. It was then transferred to a liquid meat peptone medium and cultivated under static conditions for 48 hours at 20–26° C. The bacterial culture was centrifuged and used in a further passage on a biological sludge.

100 liters of biological sludge from an activation treatment plant for waste water from the production of pressed fiber-boards containing 1% of dry matter and having a pH of 6.0 was treated by addition of 0.25 g. of ammonium phosphate per 1 liter and inocculated at a ratio of 1:20 with a bacterial culture of the genus Clostridium sp., strain V/32. The cultivation of the inocculum of the bacterial culture was carried out at 25° C. for 24 hours. Thereafter 105 liters of the inoculating culture was transferred into a tank with 20 hl. of biological sludge without the addition of nutrients and cultivated under static conditions at 20° C. for a period of 24 hours.

The content of the 20 hl. tank was then transferred ito a tank of a content of 2000 hl. containing a biological sludge of 1% dry matter and was cultivated under static conditions at a temperature of 20° C. for a period of 20 hours. Thereupon flotation of 9/10 of the sludge took place and 300 hl. of sludge of a dry matter of 6.0% was obtained.

The 300 hl. of the flotated sludge was diluted with 100 hl. of water and washed for 15 minutes under mixing. Then separation on an Alfa-Laval centrifuge, type BRPX–309 was carried out, where the sludge was dewatered up to 15% of dry matter. 115 q. of material was obtained. Then drying by conventional methods was carried out and 260 kg. of dry sludge containing 94% dry matter and 7.11% of nitrogen was obtained, i.e. 44.43% of the total proteins were absolute dry matter. The resulting product could be used as admixture into feed mixtures.

Example II

Into 100 liters of fresh native sludge of a content of 0.8% of dry matter and a pH of 7.2 there were added 47 ml. of a 65% technical-grade nitric acid and the content was mixed thoroughly. Nitric acid was further added to adjust the pH value of the medium to 5.7. The presence of the $NO_2$ ions of nitric acid enabled the microorganisms of the genus Pseudomonas which were added to the sludge to change the physical structure of the biological native sludge. The native sludge was allowed to spontaneously ferment for a period of 30 hours at a temperature of 22° C. During this time the actice bacteria were present in the native sludge in a sufficient amount and a slight flotation took place.

A part of this substance of native sludge in the amount of 10 liter was used to inocculate new 100 liters of fresh native sludge of 0.8% dry matter and a pH of 7.2. This amount was allowed to ferment for a period of 16 hours. After this time a layer of biosludge flotated, having a changed structure and a height of 14 cm. at a dry matter content of 6%. This layer represented more than 93% of the total content of the native sludge.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of concentration of organic sludges without material waste of organic matter and nitrogen comprising fermenting the aqueous organic nitrogenous matter containing sludge with nonpathogenic microorganisms capable of causing at least a partial cleavage of the cell walls, adding a nitrogenous ions-furnishing compound to the sludge, addition of said compound enabling said added non-pathogenic microorganisms in the sludge to cause said partial cleavage of the cell wall, permitting the fermentation of the sludge to proceed for a time and at a temperature sufficient to effect said cleavage and fermentation of polysaccharidic non-nitrogenous substances in the cell walls and to cause the evolution of gases predominantly consisting of carbon dioxide and methane and being substantially free of nitrogen and thus to cause the flotation of part of the sludge, discontinuing the fermentation as soon as said cleavage and flotation has occurred and before any evolution of nitrogen gas occurs, and separating the biological dry matter in the flotated part of the sludge from the aqueous phase of the flotated part of the sludge.

2. The method of claim 1, wherein anaerobic microorganisms are used.

3. The method of claim 1, wherein aerobic microorganisms are used.

4. The method of claim 1, wherein *Pseudomonas eisenbergii* is used as the microorganism.

5. The method of claim 1, wherein the sludge subject to flotation upon termination of the process contains between 5 and 7% of dry matter.

6. The process of claim 1, wherein the fermentation is carried out during a time between 24 and 46 hours.

References Cited

UNITED STATES PATENTS 2,615,842  10/1952  Kraus _____ 210—8
2,975,122   3/1961  Laboon _____ 210—13 X

OTHER REFERENCES

Laboon, J. F.: Experimental Studies on the Concentration of Raw Sludge, Sew. and Ind. Wastes, April 1952, vol 24, pp. 423–428 and 437–441 Relied On.

McCabe, J. et al.: Biological Treatment of Sewage and Industrial Wastes, Vol. II, Anaerobic Digestion and Solids-Liquid Separation, Reinhold, New York, 1958, pp. 10, 11, 20, 21, 25–27, 37, 48 and 49 Relied On.

MICHAEL E. ROGERS, Primary Examiner